Figure 1:
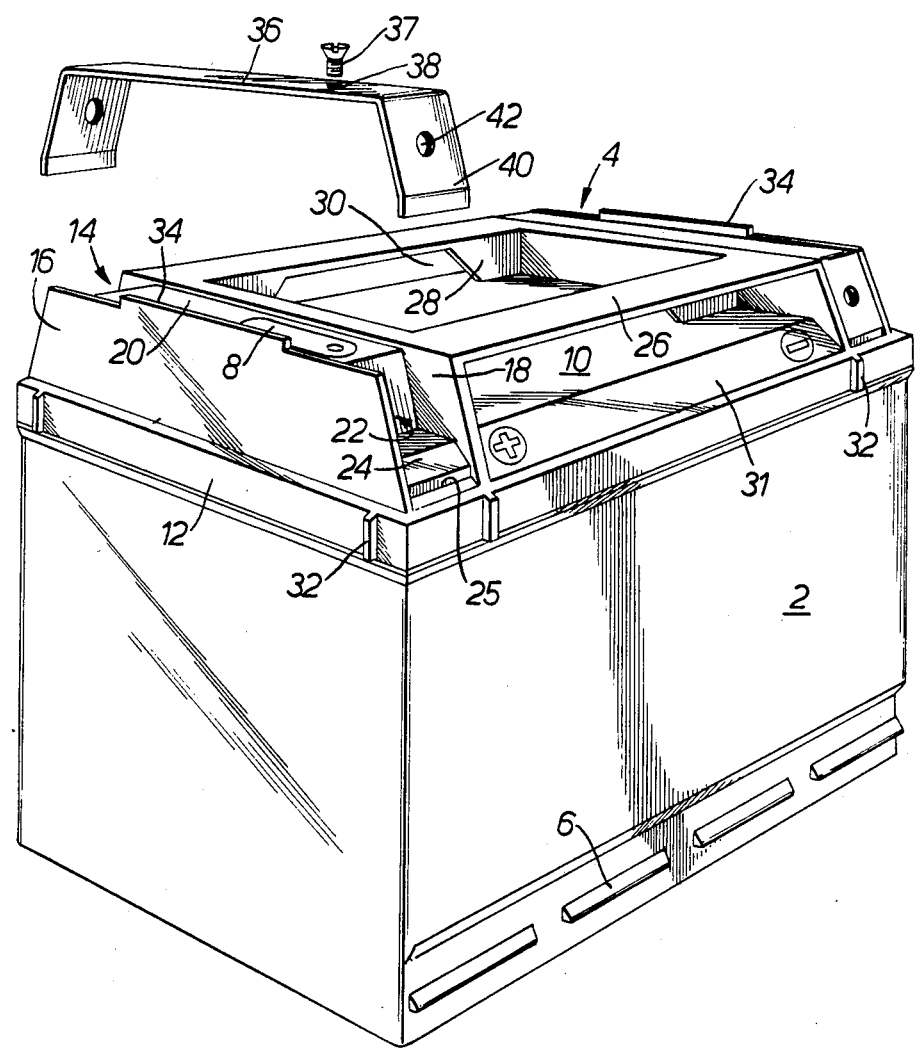

United States Patent [19]

Humphreys et al.

[11] Patent Number: 4,579,790

[45] Date of Patent: Apr. 1, 1986

[54] ELECTRIC STORAGE BATTERIES

[75] Inventors: John K. Humphreys, Whitefield; Joseph Valentine, Bolton; Donald Jones, Plaxtol, all of England

[73] Assignee: Chloride Group Public Limited Company, London, England

[21] Appl. No.: 667,820

[22] Filed: Nov. 2, 1984

[30] Foreign Application Priority Data

Nov. 4, 1983 [GB] United Kingdom ............... 8329564

[51] Int. Cl.⁴ ..................... H01M 2/10; H01M 2/30
[52] U.S. Cl. ................................. 429/65; 429/157; 429/179; 429/187
[58] Field of Search ........... 429/148, 159, 178, 187, 429/179, 71, 120, 157, 65

[56] References Cited

U.S. PATENT DOCUMENTS

| | | | |
|---|---|---|---|
| 3,745,048 | 7/1973 | Dinkler et al. | 429/120 |
| 3,871,924 | 3/1975 | DeMattie et al. | 429/178 |
| 4,424,264 | 1/1984 | McGuire et al. | 429/179 |
| 4,444,853 | 4/1984 | Halsall et al. | 429/178 |

FOREIGN PATENT DOCUMENTS

| | | |
|---|---|---|
| 221517 | 1/1925 | United Kingdom . |
| 268132 | 3/1927 | United Kingdom . |
| 389048 | 3/1933 | United Kingdom . |
| 452974 | 9/1936 | United Kingdom . |
| 531772 | 1/1941 | United Kingdom . |
| 2087133 | 5/1982 | United Kingdom ............... 429/178 |

*Primary Examiner*—Donald L. Walton
*Attorney, Agent, or Firm*—Finnegan, Henderson, Farabow, Garrett & Dunner

[57] ABSTRACT

An electric storage battery specifically designed for standby operation is described. The battery is provided with terminal surfaces extending at an acute angle to the top of the battery lid which permits a flat support surface and handle means designed into the lid. Such battery structure permits a plurality of batteries to be stacked and allows air circulation to cool the stack.

18 Claims, 4 Drawing Figures

ELECTRIC STORAGE BATTERIES

DESCRIPTION OF THE INVENTION

The present invention relates to electric storage batteries, e.g. of lead acid type, and is particularly concerned with so called standby batteries. Standby batteries are that type of battery which are used in conjunction with electric power consuming installations whose continuous operation is essential and are connected to supply the installations with electric power if the mains power supply should fail thereby ensuring continued operation of the installations until the mains power is restored.

Standby batteries are therefore in general not required to produce electric power very frequently but when they do they may produce a considerable current for a considerable period of time and therefore tend to heat up. In connection with larger installations, such as telephone exchanges, it is common to provide a large number of standby batteries in a stack electrically connected in series and/or parallel. It will be appreciated that the problem of the generation of heat and more particularly of the dissipation of this heat is exacerbated when a number of batteries are arranged in a stack since it is difficult for cooling air to circulate around the batteries. It will be appreciated also that, quite apart from the fact that many batteries are not readily stackable, it can be problematic electrically to connect a large number of batteries together in a stack since the terminals of a battery tend to be obscured or rendered relatively inaccessible by an adjacent battery and this may render it necessary to space the batteries apart and to connect them by a number of relatively lengthy trailing connectors which increases the overall resistance of the batteries.

Accordingly it is an object of the present invention to provide an electric storage battery with a terminal arrangement which facilitates the rapid fitting of a cheap low resistance connection to one or more adjacent batteries and which permits a relatively tightly packed stack of such batteries to be progressively built up and electrically connected in the required electrical configuration.

According to the present invention an electric storage battery includes a substantially rectangular section container and affords a substantially flat positive terminal surface and a substantially flat negative terminal surface, the two terminal surfaces extending at an acute angle to the horizontal. In contrast to batteries with upwardly projecting top terminals or with side terminals, the battery of the present invention with inclined terminal surfaces may be very simply and efficiently connected to one or more adjacent batteries regardless of whether the batteries to be connected are arranged side by side and/or end to end and/or one on top of the other.

In the event that there are only two terminal surfaces, that is to say one terminal surface of each polarity, these are preferably situated adjacent the same side surface of the container. It is however preferred that the battery has two terminal surfaces of each polarity, one terminal surface of each polarity being situated adjacent each of two opposite side surfaces of the container. It will be appreciated that this construction considerably enhances the ease of connection of adjacent batteries and the flexibility of the electrical configuration in which a stack of such batteries may be connected. The two terminal surfaces of each polarity are preferably integrally connected by a respective terminal strap since this permits them to be connected to the electrochemical components of the battery by a single electrical connection rather than by a respective electrical connection.

In the preferred embodiment the container is sealed by a lid and the terminal surfaces are carried by the lid. The terminal straps preferably extend over the upper surface of the lid and each terminal surface is preferably set back with respect to the side surface of the container to which it is adjacent since this automatically results in spaces permitting access to the terminal surfaces even when the battery is immediately adjacent a further such battery. When making an electrical connection to a terminal surface a connector must be held in electrical contact with this surface and it is preferred that each terminal surface affords connection means by which an electrical connector member may be held in electrical contact with it. This connection means may constitute a threaded hole in the terminal surface and it will be appreciated that this will additionally ensure a reliable electrical contact with the connector.

It is preferred that the lid includes two upstanding formations extending along two opposed side edges of the lid and that the terminal straps extend over a respective one of the upstanding formations. In order to avoid inadvertent short circuiting of the battery it may include an insulating cover associated with each terminal strap and removably secured to the battery so as substantially to cover the associated terminal strap.

The battery preferably also includes handle means extending between the upstanding formations and spaced from the remainder of the lid, the handle means affording a substantially flat support surface. The provision of the flat support surface enables two or more batteries to be stacked on top of one another and the spacing of the handle means from the remainder of the lid permits air to circulate over and around the battery, even when it forms part of a stack of batteries, to cool it.

The present invention also embraces a battery of the type referred to above electrically connected to a further such battery. The two batteries may be so disposed that they afford respective adjacent substantially parallel terminal surfaces, in which event the electrical connection is preferably constituted by a substantially straight connector member extending between the two batteries and retained in electrical contact with the two said terminal surfaces. Alternatively or in addition, the two batteries may be so disposed that they afford respective and adjacent but inclined terminal surfaces, in which event the electrical connection is preferably constituted by a connector member extending between the two batteries and affording two inclined contact surfaces, each retained in electrical contact with a respective one of the two said terminal surfaces.

Figure 4:
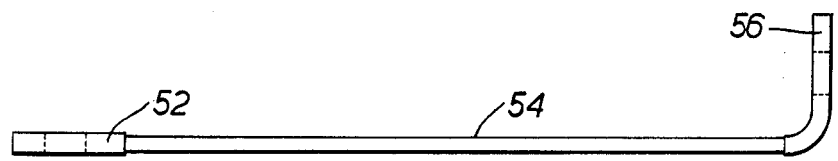
Figure 3:
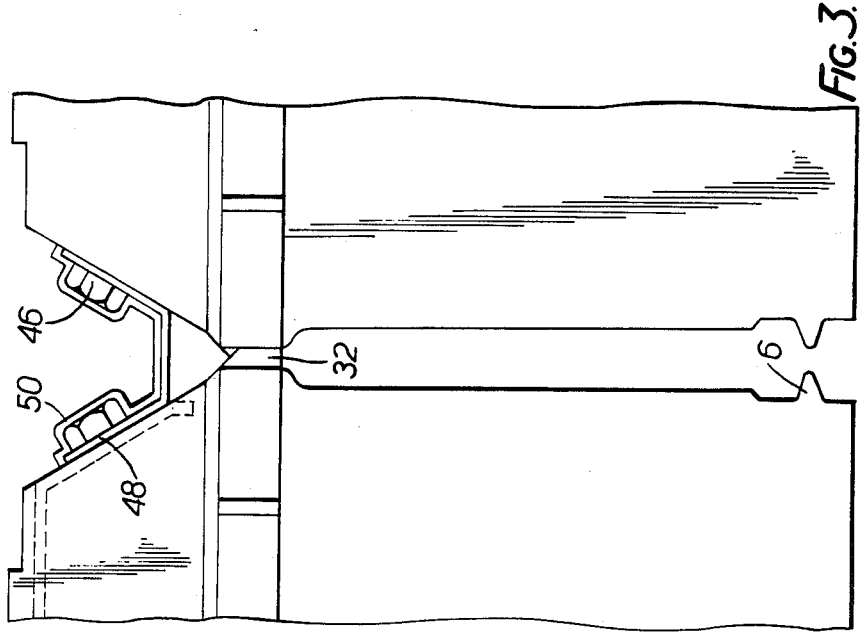
Figure 2:
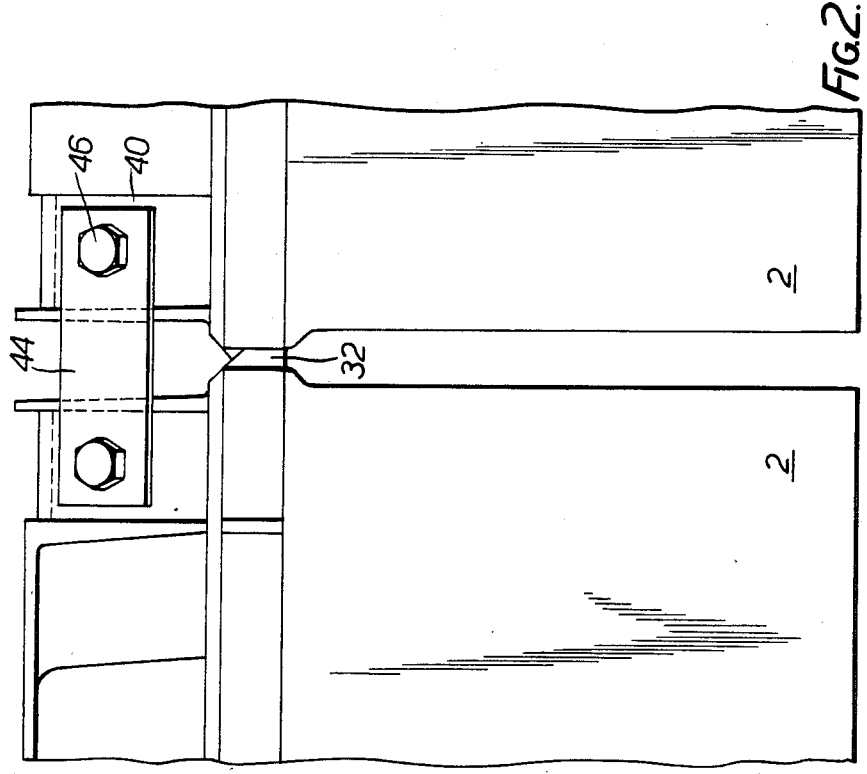

Further features and details of the present invention will be apparent from the following description of one specific embodiment which is given by way of example only with reference to the accompanying drawings, in which:

FIG. 1 is a perspective view of a 12 volt lead acid standby battery of recombination type; and FIGS. 2 and 3 are scrap side and end elevations respectively showing the two types of connector used to connect two batteries end to end and side by side; and FIG. 4 is an elevation of a connector used to connect two batteries situated one above the other.

Referring firstly to FIG. 1, the battery comprises a rectangular container 2 sealed by a lid 4. Towards the bottom of one or both pairs of opposed side walls of the container there are one or more so called hold-down ledges 6 by which the battery may be secured in position, if desired. The contruction and function of such ledges is well known and forms no part of the present invention.

The electrical and electrochemical elements within the container also form no part of the present invention and are not shown but, briefly, the six cells are separated from one another by intercell partitions integral with the container and contain plates of alternating polarity separated by separators of microfine glass fibre material and substantially no free unabsorbed electrolyte. Adjacent cells are interconnected in any conventional manner by intercell connectors and the two end cells are connected to a respective terminal pillar which is connected to a terminal insert 8 (seen in FIG. 1) which is moulded into the battery lid and affords a threaded hole.

The lid 4 is a generally rectangular section integral moulding of polypropylene or the like and affords a substantially planar horizontal surface 10 and a depending skirt 12 which is connected, e.g. by hot plate welding, to the container 2. Extending across substantially the full length of each of the two shorter sides of the lid is an upstanding formation 14 defined by a vertical web 16 adjacent the respective side of the lid and a further such web 18 extending parallel thereto. The bottom of the space defined between the webs 16 and 18 is closed by a web 20 which includes a central horizontal portion in which a respective terminal insert 8 is situated. The central horizontal portion terminates slightly short of the tops of the webs 16 and 18 and the web 20 has a step at each end defining a recess 22 at each end of the said space and terminating at each end in a ramp surface 24 extending downwardly and outwardly at 45°.

The ends of the webs 16 and 18 are inwardly inclined at between 30° and 70°, in this case at about 50° to the horizontal and the webs 18 are connected at their ends by webs 26 which constitute handles whose upper surface is substantially coplanar with that of the webs 16 and 18. The inner edge of each handle web 26 is integral with a vertical reinforcing web 28 which is also integral with the surface 10. Each web 28 is formed with a central cut-away portion 30. By virtue of the fact that the two handle webs 26 are spaced apart and are set back from the vertical side edges of the container, air can circulate freely under the handle web 26, through the cut-away portions 30 and over the planar surface 10 thereby maintaining the battery cool when it is passing a substantial current. The upper surface of the lid is provided with a downwardly and outwardly inclined elongate ramp surface 31 beneath each handle web 26 which additionally promotes the inflow of convection currents of cooling air over and around the surface of the lid.

Each of the four sides of the depending skirt 12 is provided with two spaced spacing projections 32 to ensure that when two or more batteries are placed side by side they are spaced apart by at least about 5 mm to permit air to circulate freely about them. Each of the outer webs 16 is provided with a short central upstanding portion 34 arranged to fit into a hole or behind a peripheral rib (not shown) on the base of an identical battery stacked on it so as to locate the two batteries relative to one another.

An inverted U shaped terminal strap 36 of copper or the like rests on the horizontal portion of each web 20 with its upper surface slightly recessed below the tops of the webs 16 and 18 and is secured in position by a respective countersunk screw 37 which passes through a hole 38 in the strap and is received in the threaded hole in the insert 8. The two limbs 40 of the straps 36 extend downwardly and outwardly at a similar angle to the ends of the webs 16 and 18 covering the recesses 22 and engaging the associated ramped surfaces 24. The limbs 40 of the straps extend substantially parallel to the side edges of the webs 16 and 18 and constitute conductive planar terminal surfaces and are provided with a threaded hole 42 adapted to receive a bolt or the like which will extend into the associated recess 22 and electrically connect the battery to a trailing connector or a further battery. The free ends of the terminal straps extend vertically and are received in respective slots 25 adjacent the ramp surfaces 24 and thus protect the terminal straps against deformation.

The two terminal straps constitute large and exposed conductive areas and it will be appreciated that it would be easy inadvertently to short the battery. For this reason the battery is provided when sold with two terminal covers (not shown) of plastics material whose shape corresponds to that of the terminal straps and provided with integral hinges at positions corresponding to those at which the limbs 40 of the straps are connected to the horizontal cross-piece. The terminal covers may be secured in position by projections on them which are a push fit into the threaded holes 42 or further holes provided for this purpose.

The provision of an inclined conductive terminal surface of each polarity adjacent each of two opposed sides of the battery permits a large number of such batteries to be easily and rapidly connected together in series or parallel with considerable flexibility as regards the configuration of the batteries. FIG. 2 shows how two batteries may be connected end to end with two terminal surfaces of adjacent batteries lying in a common plane. A conductive connector bar or strip 44 is connected to the two terminal surfaces by means of bolts 46 which pass through holes in the connector bar and are received in the threaded holes 42. The connector bar bridges the gap between the two batteries and lies flat against the two terminal surfaces and is urged into reliable electrical contact therewith by the bolts 46.

FIG. 3 is a similar view showing how two batteries may be connected side by side by means of a conductive connector strip 48 bent to flat-bottomed V shape. As in FIG. 2, the connector strip is placed into contact with the terminal surfaces and there retained in position by bolts 46. The connector strip of FIG. 3 may be protected, if desired, by a similarly shaped plastics cover strip 50 moulded to shape or formed with appropriately positioned integral hinges and which are provided with recesses whose shape corresponds to that of the heads of the bolts and which are a push fit over the bolts. The connector strip of FIG. 2 may be similarly protected by means of a flat cover strip.

The flat upper surface afforded by the handle webs of the lid and the side webs 16 and 18 also permit batteries to be stacked vertically. Such batteries may be electrically connected by a connector of the type illustrated in FIG. 4. This comprises a flat conductive contact member or tag 52 electrically connected by means of a flexible connection 54, which may be sheathed in insulating material, to a cranked or right angled conductive contact member 56. Each contact member has a hole formed in it by which it may be retained in electrical contact with a respective terminal surface of a battery by means of a terminal bolt. In use, the cranked contact member 56 is connected to a terminal surface of a battery whilst the flat contact member 52 is connected to a terminal surface of a further battery resting on it. It will be appreciated that the angling of the contact member 56 directs the flexible connection 54 generally in the direction of the terminal surface of the uppermost battery and thus results in a reduction in the distance by which the flexible connection projects from the side surfaces of the two batteries. It will be appreciated that the provision of flat terminal surfaces affording a threaded hole permits each terminal surface to be readily connected to three or even more adjacent batteries using a single terminal bolt.

The stackability of the battery coupled with the provision of an inclined terminal surface of each polarity adjacent two opposed sides of the lid permits a large stack of such batteries to be formed and readily connected together in any desired electrical configuration for standby purposes. The construction and disposition of the handles together with the provision of the spacing projections ensures that air may readily circulate through the stack to cool it.

The batteries are readily located in their desired relative horizontal positions prior to connecting them by virtue of the fact that the spacing projections 32 on one of each pair of opposed sides of the lid are horizontally offset inwards with respect to the corresponding projections on the opposite side of the lid by a distance substantially equal to the horizontal thickness of the spacing projections. Thus when the two batteries are placed end to end or side by side the outer surfaces of a pair of projections on one battery contact the inner surfaces of the corresponding pair of projections on the other battery.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An electric storage battery comprising a substantially rectangular container having at least two opposite vertical side surfaces, two substantially flat positive terminal surfaces and two substantially flat negative terminal surfaces, said terminal surfaces extending at an acute angle to the horizontal with one terminal surface of each polarity being situated adjacent one of each of the two opposite side surfaces of said container.

2. A battery as claimed in claim 1 including a respective terminal strap integrally connecting the two terminal surfaces of each polarity.

3. A battery as claimed in claim 2 including a respective single threaded member passing through said terminal straps and electrically connecting them to said battery.

4. A battery as claimed in claim 1 wherein said container is sealed by a lid and said terminal surfaces are carried by said lid.

5. A battery as claimed in claim 4 wherein said lid includes two upstanding formations extending along two opposed side edges of said lid, each formation carrying the two terminal surfaces of each polarity.

6. A battery as claimed in claim 5 including handle means extending between said upstanding formations and spaced from the remainder of said lid, said handle means affording a substantially flat support surface.

7. A battery as claimed in claim 6 wherein said handle means comprises two spaced handle webs extending adjacent the other two opposed side edges of said lid.

8. A battery as claimed in claim 1 wherein each terminal surface is set back with respect to the side surface of said container to which it is adjacent.

9. A battery as claimed in claim 1 wherein each terminal surface affords connection means by which an electrical connector member may be held in electrical contact with it.

10. A battery as claimed in claim 1 electrically connected to a further such battery, said two batteries being so disposed that they afford respective adjacent substantially parallel terminal surfaces, the electrical connection being constituted by a substantially straight connector member extending between said two batteries and retained in electrical contact with said adjacent terminal surfaces.

11. A battery as claimed in claim 1 electrically connected to a further such battery, said two batteries being so disposed that they afford respective and adjacent but inclined terminal surfaces, the electrical connection being constituted by a connector member extending between said two batteries and affording two inclined contact surfaces, each retained in electrical contact with a respective one of the two said adjacent but inclined terminal surfaces.

12. A battery as claimed in claim 1 electrically connected to a further such battery vertically above it, the electrical connection being constituted by a connector member comprising a substantially flat contact member electrically connected by a flexible member to a cranked contact member, said flat and cranked contact members being retained in electrical contact with a respective terminal surface of said two batteries.

13. A battery as claimed in claim 12 including an insulating cover member substantially shielding said connector member against inadvertent electrical contact.

14. An electric storage battery comprising a substantially rectangular container, two substantially flat positive terminal surfaces and two substantially flat negative terminal surfaces, said terminal surfaces extending at an acute angle to the horizontal, a respective terminal strap integrally connecting said two terminal surfaces of said polarity, and a lid sealing said container wherein said terminal surfaces are carried by said lid and said terminal straps extend over the upper surface of said lid.

15. A battery as claimed in claim 14 wherein said lid includes two upstanding formations extending along two opposed side edges of said lid and said terminal straps extend over a respective one of said upstanding formations.

16. A battery as claimed in claim 15 wherein each terminal surface affords connection means by which an electrical connector member may be held in electrical connection with it and wherein said connection means comprise a threaded hole and said upstanding formations and associated terminal straps together define a space adapted to accommodate the end of a bolt threaded into said hole.

17. An electric storage battery including a substantially rectangular container sealed by a lid, said lid having two upstanding formations extending adjacent two opposed side edges of said lid, two substantially flat positive terminal surfaces and two substantially flat negative terminal surfaces, each upstanding formation carrying said positive and negative terminal surfaces respectively at opposite ends thereof, each terminal surface extending at an acute angle to the horizontal and affording connection means by which an electrical contact member may be held in electrical contact with it.

18. An electric storage battery including a substantially rectangular container sealed by a lid, said lid having an upper surface and carrying support means extending above said upper surface and adapted to space a further battery supported on said support means from said upper surface, said battery further including two substantially flat positive terminal surfaces and two substantially flat negative terminal surfaces, said terminal surfaces extending above said upper surface of said lid, each terminal surface extending at an acute angle to the horizontal and affording connection means by which an electrical contact member may be held in electrical contact with it.

* * * * *